(12) United States Patent
Bai

(10) Patent No.: US 10,623,027 B2
(45) Date of Patent: *Apr. 14, 2020

(54) MULTIWAY SWITCH, RADIO FREQUENCY SYSTEM, AND COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/183,711

(22) Filed: Nov. 7, 2018

(65) Prior Publication Data

US 2019/0288714 A1    Sep. 19, 2019

(30) Foreign Application Priority Data

Mar. 16, 2018    (CN) .......................... 2018 1 0220944

(51) Int. Cl.
*H04B 7/06* (2006.01)
*H04B 1/00* (2006.01)
(Continued)

(52) U.S. Cl.
CPC .............. *H04B 1/005* (2013.01); *H04B 1/40* (2013.01); *H04B 1/44* (2013.01); *H04B 7/0404* (2013.01); *H04B 7/0686* (2013.01); *H04Q 3/00* (2013.01); *H04Q 3/0004* (2013.01); *H01Q 7/00* (2013.01); *H04Q 2213/1302* (2013.01)

(58) Field of Classification Search
CPC .......... H04B 1/40; H04B 1/44; H04B 7/0404; H04B 7/0686; H04Q 3/00; H04Q 3/0004
USPC ............... 375/219, 267, 295, 299, 316, 347; 455/91, 101, 132
See application file for complete search history.

(56) References Cited

U.S. PATENT DOCUMENTS

| 9,960,791 B2 | 5/2018 | Desclos et al. |
| 10,075,199 B2 | 9/2018 | King et al. |

(Continued)

FOREIGN PATENT DOCUMENTS

| CN | 101321012 A | 12/2008 |
| CN | 101867402 A | 10/2010 |

(Continued)

OTHER PUBLICATIONS

Extended European search report issued in corresponding European application No. 18205931.1 dated May 28, 2019.

(Continued)

*Primary Examiner* — Tesfaldet Bocure
(74) *Attorney, Agent, or Firm* — Young Basile Hanlon & MacFarlane, P.C.

(57) ABSTRACT

A multiway switch, a radio frequency system, and a communication device includes ten T ports and four P ports. The ten T ports include two first T ports, and each of the two first T ports is coupled with all the four P ports. The antenna system includes four antennas corresponding to the four P ports. The multiway switch is coupled with the radio frequency circuit and the antenna system to implement a function of transmitting a sounding reference signal (SRS) through the four antennas in turn.

20 Claims, 12 Drawing Sheets

(51) Int. Cl.
*H04B 1/40* (2015.01)
*H04B 7/0404* (2017.01)
*H04B 1/44* (2006.01)
*H04Q 3/00* (2006.01)
*H01Q 7/00* (2006.01)

(56) References Cited

U.S. PATENT DOCUMENTS

| | | | |
|---|---|---|---|
| 10,355,738 B1* | 7/2019 | Bai | H04Q 3/0004 |
| 10,389,401 B1* | 8/2019 | Bai | H03K 17/6871 |
| 10,419,040 B1* | 9/2019 | Bai | H04B 1/0064 |
| 2005/0036505 A1 | 2/2005 | Frei et al. | |
| 2009/0054093 A1 | 2/2009 | Kim et al. | |
| 2013/0308554 A1 | 11/2013 | Ngai et al. | |
| 2014/0211873 A1 | 7/2014 | Park et al. | |
| 2014/0227982 A1 | 8/2014 | Granger-Jones et al. | |
| 2015/0171914 A1 | 6/2015 | Desclos et al. | |
| 2015/0340769 A1 | 11/2015 | Desclos et al. | |
| 2017/0155444 A1 | 6/2017 | Patel et al. | |
| 2017/0164226 A1 | 6/2017 | Wei et al. | |
| 2017/0195004 A1 | 7/2017 | Cheng et al. | |
| 2018/0026379 A1 | 1/2018 | Barker et al. | |

FOREIGN PATENT DOCUMENTS

| | | |
|---|---|---|
| CN | 102111176 A | 6/2011 |
| CN | 202103661 A | 1/2012 |
| CN | 103905104 A | 7/2014 |
| CN | 105245295 A | 1/2016 |
| CN | 105703053 A | 6/2016 |
| CN | 108462507 A | 8/2018 |
| EP | 2485555 A1 | 8/2012 |
| WO | 2012026601 A1 | 3/2012 |
| WO | 2012109988 A1 | 8/2012 |

OTHER PUBLICATIONS

Gao Xiang et al: "Multi-Switch for Antenna Selection in Massive MIMO", 2015 IEEE Global Communications Conference (GLOBECOM), IEEE, Dec. 6, 2015 (Dec. 6, 2015), pp. 1-6, XP032872922, DOI: 10.1109/GLOCOM.2014.7417765; abstract; figures 1, 2, 5, 6; Sections I, III.B, III.C.

Guy Lemieux et al: "Generating highly-routable sparse crossbars for PLDs", FPGA'00. ACM/SIGDA International Symposium on Field Programmable Gate Arrays. Monterey, CA, Feb. 9-11, 2000; [ACM/SIGDA International Symposium on Field Programmable Gate Arrays], New York, NY : ACM, US, Feb. 1, 2000 (Feb. 1, 2000), pp. 155-164, XP058160667, DOI: 10.1145/329166.329199 ISBN: 978-1-58113-193-2; abstract; figure 1; Section 2.

International search report issued in corresponding international application No. PCT/CN2018/114612 dated Jan. 30, 2019.

Extended European search report issued in corresponding European application No. 18203600.4 dated May 28, 2019.

International search report issued in corresponding international application No. PCT/CN2018/114406 dated Jan. 30, 2019.

* cited by examiner

Filter  Low noise amplifier

MULTIWAY SWITCH, RADIO FREQUENCY SYSTEM, AND COMMUNICATION DEVICE

CROSS-REFERENCE TO RELATED APPLICATION(S)

This application claims priority to Chinese Patent Application No. 201810220944.8, filed on Mar. 16, 2018, the entire disclosure of which is hereby incorporated by reference.

TECHNICAL FIELD

This disclosure relates to the field of communication technology, and particularly to a multiway switch, a radio frequency system, and a communication device.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, an electronic device supporting a four-antenna RF system architecture is proposed.

SUMMARY

Implementations of the disclosure provide a multiway switch, a radio frequency system, and a communication device.

According to a first aspect of the implementations of the disclosure, a multiway switch is provided. The multiway switch includes ten T ports and four P ports. The ten T ports include two first T ports, and each of the two first T ports is coupled with all the four P ports. The ten T ports are configured to be coupled with a radio frequency circuit of a communication device, and the four P ports are configured to be coupled with an antenna system including four antennas of the communication device. The multiway switch is configured to implement a function of transmitting an SRS through the four antennas in turn.

According to a second aspect of the implementations of the disclosure, a radio frequency system is provided. The radio frequency system includes an antenna system, a radio frequency circuit, and a multiway switch coupled with the radio frequency circuit and the antenna system. The multiway switch includes ten T ports and four P ports. The ten T ports include two first T ports, and each of the two first T ports is coupled with all the four P ports. The antenna system includes four antennas corresponding to the four ports. The multiway switch is configured to implement a function of transmitting an SRS through the four antennas in turn.

According to a third aspect of the implementations of the disclosure, a communication device is provided. The communication device includes an antenna system, a radio frequency circuit, and a multiway switch coupled with the radio frequency circuit and the antenna system. The multiway switch includes ten T ports and four P ports. The ten T ports include two first T ports, and each of the two first T ports is coupled with all the four P ports. The antenna system includes four antennas corresponding to the four ports. The multiway switch is configured to implement a function of transmitting an SRS through the four antennas in turn.

BRIEF DESCRIPTION OF THE DRAWINGS

To describe technical solutions in implementations of the present disclosure more clearly, the following briefly introduces the accompanying drawings required for describing the implementations. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1A:
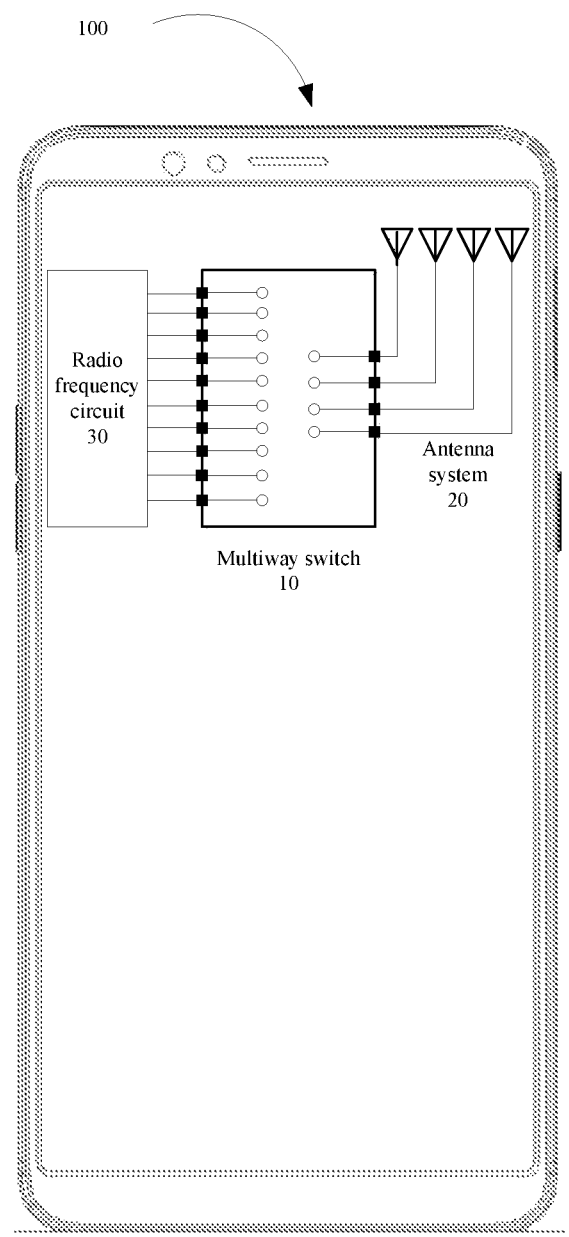
FIG. 1A is a schematic structural diagram illustrating an electronic device according to an implementation of the disclosure.

Technical solutions in implementations of the present disclosure will be described clearly and completely hereinafter with reference to the accompanying drawings of the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The communication device involved in the implementations of the present disclosure includes an electronic device or a network device, and the electronic device may include various handheld devices, in-vehicle devices, wearable devices, computing devices that have wireless communication functions, or other processing devices connected to wireless modems, as well as various forms of user equipment (UE), mobile stations (MS), terminal devices, and the like. For the sake of easy description, the above-mentioned devices are collectively referred as an electronic device.

The network device may be a base station. The base station can communicate with one or more electronic devices, and can also communicate with one or more base stations having part of functions of the electronic device (for example, a communication between a macro base station and a micro base station, for example, between access points (APs)). The base station may be a base transceiver station (BTS) of a time division synchronous code division multiple access (TD-SCDMA) system, and also may be an evolutional node B (eNB) of a long term evolution (LTE) system, and also may be a base station of a new radio (NR) system of the fifth generation (5G) system. In addition, the base station may be an AP, a transmission point, a central unit (CU) or other network entity, and can include part of or all functions of the above network entities.

In the following implementations, the electronic device is taken as an example to illustrate the communication device.

At present, sounding reference signal (SRS) switching in four antennas of a mobile phone is a mandatory option for China mobile communications corporation (CMCC) in the China mobile 5G Scale Test Technical White Paper Terminal, which is optional in the 3rd generation partnership project (3GPP). The SRS is mainly for a base station to determine quality and parameters of four channels via measuring uplink signals of the four antennas of the mobile phone, and perform a beamforming of a downlink massive multi-input multi-output (MIMO) antenna array on the four channels according to a channel reciprocity, and finally, the downlink 4×4 MIMO is enabled to obtain the best data transmission performance. The 4×4 MIMO refers to that the base station has four antennas to transmit data and the terminal device has four antennas to receive data.

In order to satisfy requirements of the SRS switching in the four antennas, the implementations of the present disclosure provide a radio frequency architecture based on a simplified 4P10T antenna switch. Compared with a 3P3T/DPDT/multiway small switch switching scheme, the present switching scheme can reduce the number of series switches in each path (all or part of switches are integrated into the 4P10T switch), thereby reducing link loss and optimizing the overall transmission and reception performance of the terminal. The implementations of the present disclosure are described in detail below.

Referring to FIG. 1A, FIG. 1A is a schematic structural diagram illustrating an electronic device 100 according to an implementation of the disclosure. The electronic device 100 supports a dual-frequency single-transmit mode, that is, the electronic device 100 can support dual frequency band-one uplink transmit path or dual frequency band-four downlink receive paths. The electronic device includes a multiway switch 10, an antenna system 20, and a radio frequency circuit 30. The antenna system 20 includes four antennas. The multiway switch 10 includes ten T ports and four P ports. The ten T ports include two first T ports, and each first T port is fully coupled with the four P ports, that is, each first T port is coupled with all of the four P ports. The four P ports and the four antennas are in a one-to-one coupling relationship, that is, each of the four ports is coupled with a corresponding antenna of the four antennas.

The multiway switch 10 is coupled with the radio frequency circuit 30 and the antenna system 20 to implement a preset function of the electronic device 100. The preset function is a function of transmitting an SRS through the four antennas in turn, which can be understood as a four-port SRS transmit function.

The electronic device may be a 5G NR mobile phone terminal or other 5G NR terminal device, for example, a customer premise equipment (CPE) or a mobile Wifi.

"P port" in the implementation of the present disclosure is the abbreviation of "polarized port", which refers to ports coupled with the antennas. "T port" in the implementations of the present disclosure is the abbreviation of "throw port", which refers to ports coupled with the radio frequency circuit. In the implementation of the present disclosure, four P ports and ten T ports are included. For understanding the multiway switch 10 intuitively, in the implementation of the present disclosure, the multiway switch 10 is also referred as a 4P10T switch.

In the implementation of the present disclosure, the full coupling is defined for the T port, and indicates that the T port is coupled with all the P ports. The first T port is a port of full coupling, and is coupled with all the four P ports.

The transmitting an SRS through the four antennas in turn refers to a process in which the electronic device 100 interacts with a base station based on a polling mechanism to determine quality of an uplink channel corresponding to each of the four antennas.

The ten T ports further include eight second T ports. Each second T port is independently coupled with one of the four P ports, that is, one second T port is merely coupled with one P port, and one P port may be coupled with different second T ports. The second T ports corresponding to the same frequency band are coupled with different P ports. The four P ports are coupled with the four antennas, and the four P ports and the four antennas are in a one-to-one correspondence relationship. The first T ports at least support a transmit function, that is, the first T ports can be configured to transmit radio frequency signals, and also can be configured to receive and transmit radio frequency signals. The second T ports merely support a receive function, that is, the second T ports is merely configured to receive radio frequency signals.

The eight second T ports include four second T ports for receiving radio frequency signals of a first frequency band and four second T ports for receiving radio frequency signals of a second frequency band, and the first frequency band and the second frequency band do not overlap.

That the P ports coupled with the T ports corresponding to the same frequency band are different from each other refers to that the P ports coupled with the T ports for receiving radio frequency signals of the same frequency band are different from each other. For example, the second T port 1 is configured to receive radio frequency signals of the first frequency band, the second T port 2 is configured to receive radio frequency signals of the first frequency band, the second T port 1 is coupled with the P port 1, the second T port 2 is coupled with the P port 2, and the P port 1 is different from the P port 2.

Independent coupling is defined for the T ports, and refers to that one T port is merely coupled with one P port. In the implementation of the present disclosure, the eight second T ports are ports of independent coupling.

The first frequency band and the second frequency band are both 5G NR frequency bands. For the sake of easy illustration, "NR Band Nx" is used to indicate the first frequency band supported by the 5G NR electronic device, and "NR Band Ny" is used to indicate the second frequency band supported by the 5G NR electronic device. For example, the first frequency band is 3.3 GHz-3.8 GHz, and the second frequency band is 4.4 GHz-5 GHz. Alternatively, the first frequency band is 4.4 GHz-5 GHz, and the second frequency band is 3.3 GHz-3.8 GHz.

In the implementation of the present disclosure, the ten T ports are classified into first T ports and second T ports. The first T ports are ports of full coupling, and the number of the first T ports are two. One first T port is configured to transmit radio frequency signals of the NR Band Nx, and the other first T port is configured to transmit radio frequency signals of the NR Band Ny. The second T ports are ports of independent coupling, and the number of the second T ports is eight. The eight second T ports include four second T ports for receiving radio frequency signals of the NR Band Nx and four second T ports for receiving radio frequency signals of the NR Band Ny.

Figure 1B:
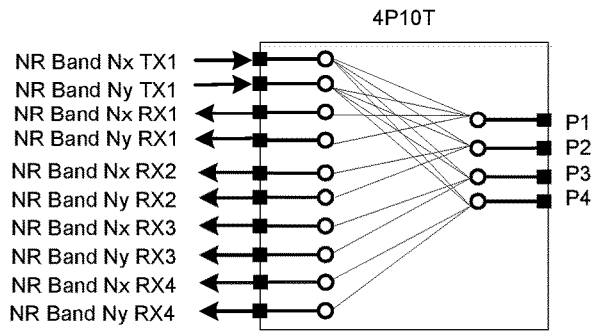
FIG. 1B is a schematic structural diagram illustrating a 4P10T switch according to an implementation of the disclosure.

Referring to FIG. 1B, FIG. 1B is a schematic structural diagram illustrating a 4P10T switch according to an implementation of the present disclosure. As illustrated in FIG. 1B, one first T port is an "NR Band Nx TX1" port and is configured to transmit radio frequency signals of the NR Band Nx, and the other first T port is an "NR Band Ny TX1" port and is configured to transmit radio frequency signals of the NR Band Ny. The eight second T ports are respectively an "NR Band Nx RX1" port, an "NR Band Ny RX1" port, an "NR Band Nx RX2" port, an "NR Band Ny RX2" port, an "NR Band Nx RX3" port, an "NR Band Ny RX3" port, an "NR Band Nx RX4" port, and an "NR Band Ny RX4" port. The four P ports are a P1 port, a P2 port, a P3 port, and a P4 port, respectively. The "NR Band Nx TX1" port is coupled with the P1 port, the P2 port, the P3 port, and the P4 port, and the "NR Band Ny RX1" port is coupled with the P1 port, the P2 port, the P3 port, and the P4 port. The "NR Band Nx RX1" port, the "NR Band Nx RX2" port, the "NR Band Nx RX3" port, and the "NR Band Nx RX4" port are the ports configured to receive radio frequency signals of the NR Band Nx. The "NR Band Ny RX1" port, the "NR Band Ny RX2" port, the "NR Band Ny RX3" port, and the "NR Band Ny RX4" port are the ports configured to receive radio frequency signals of the NR Band Ny. To avoid a co-channel interference, the P ports independently coupled with the four second T ports configured to receive radio frequency signals of the NR Band Nx are different from each other, and the P ports independently coupled with the four second T ports configured to receive radio frequency signals of the NR Band Ny are different from each other. In FIG. 1B, the "NR Band Nx RX1" port and the "NR Band Ny RX1" port are coupled with the P1 port, the "NR Band Nx RX2" port and the "NR Band Ny RX2" port are coupled with the P2 port, the "NR Band Nx RX3" port and the "NR Band Ny RX3" port are coupled with the P3 port, and the "NR Band Nx RX4" port and the "NR Band Ny RX4" port are coupled with the P4 port. What needs to be illustrated is that a connection manner in which the second T ports are coupled with the P ports are merely a possible example, and what is needed is that the condition that the P ports independently coupled with the four second T ports configured to receive radio frequency signals of the first frequency band are different from each other and the P ports independently coupled with the four second T ports configured to receive radio frequency signals of the second frequency band are different from each other is satisfied.

The coupling, independent coupling, full coupling, or other kinds of coupling between the T ports and the P ports of the multiway switch 10 illustrated in the implementations of the disclosure refers to that the T ports are coupled with the P ports through first switch transistors. The first switch transistors are configured to control a communication between the T ports and the P ports (including a one-way communication from the T ports to the P ports and a one-way communication from the P ports to the T ports). The first switch transistor may be, for example, a switch array including three field effect transistors (for example, metal-oxide-semiconductor (MOS) transistors). When the first switch transistor is disconnected and not grounded, parasitic parameters (such as a parasitic capacitance, a parasitic inductance, and so on) greatly affect performance of other connected ports. Therefore, the first switch transistor is implemented with three MOS transistors. When the first switch transistor is disconnected, two MOS transistors at two ends are disconnected and one MOS transistor in the middle is grounded. Besides the first switch transistors between the T ports and the P ports, the multiway switch 10 further includes second switch transistors arranged merely coupled with the T ports and second switch transistors arranged merely coupled with the P ports. The second switch transistor can also be referred as a grounding switch transistor. Each T port can be provided with one grounding switch transistor, and each P port can also be provided with one grounding switch transistor. When the T ports or the P ports are not used to perform signal transmission and signal reception, the corresponding grounding switch transistors are switched on, and when the T ports or the P ports perform signal reception or signal transmission, the corresponding grounding switch transistors are switched off. The second switch transistor is configured to activate a corresponding port (T port or P port) and may be, for example, a MOS transistor. The specific configurations of the first switch transistor and the second switch transistor are not limited herein. In an implementation, the electronic device 100 can control conduction of paths between the T ports and the P ports through the first switch transistors. In an implementation, the electronic device 100 can be provided with a dedicated controller coupled with the switch transistors of the multiway switch 10.

The multiway switch 10 includes the field effect transistors. For example, it is assumed that ten T ports are included and the multiway switch includes the field effect transistors, among the ten T ports, if each T port is fully coupled with the four P ports, the number of the field effect transistors of the multiway switch is 4+10*4*3+4=128; if only two T ports are fully coupled with the four P ports, the number of the field effect transistors of the multiway switch is 10+(2*4+ (10-2)*1)*3+4=62. Obviously, applying the implementation of the present disclosure, the number, the volume, and the cost of the field effect transistors of the 4P10T switch can be reduced, thereby improving performance.

In addition, the electronic device 100 further includes a radio frequency transceiver. The radio frequency transceiver is coupled with the radio frequency circuit, and the radio frequency transceiver, the radio frequency circuit, the multiway switch, and the antenna system constitute the radio frequency system of the electronic device.

By way of limiting the number of the T ports fully coupled with the four P ports, the number of the switches of the radio frequency system of the electronic device can be effectively reduced. The number of the T ports of full coupling affects the performance of the radio frequency system.

Figure 1C:
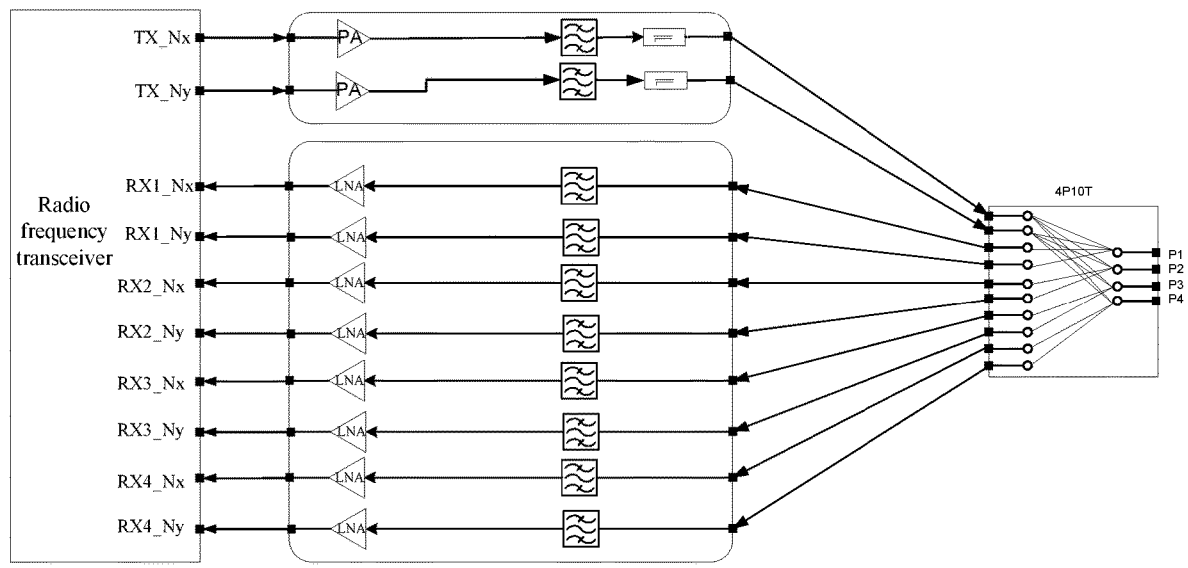
FIG. 1C is a schematic structural diagram illustrating another electronic device according to an implementation of the disclosure.

Alternatively, referring to FIG. 1C, FIG. 1C is a schematic structural view illustrating an electronic device according to an implementation of the present disclosure. As illustrated in FIG. 1C, the electronic device 100 includes a radio frequency transceiver and two independent circuit modules. One independent circuit module includes two transmitter circuits, where one of the transmitter circuits is a first transmit path supporting transmission of radio frequency signals of the NR Band Nx, and the other of the transmitter circuits is a second transmit path supporting transmission of radio frequency signals of the NR Band Ny. Another independent circuit module includes eight receiver circuits, where the eight receiver circuits are respectively a first receive path supporting reception of radio frequency signals of the NR band Nx, a second receive path supporting reception of radio frequency signals of the NR band Ny, a third receive path supporting reception of radio frequency signals of the NR Band Nx, a fourth receive path supporting reception of radio frequency signals of the NR Band Ny, a fifth receive path supporting reception of radio frequency signals of the NR Band Nx, a sixth receive path supporting reception of radio frequency signals of the NR Band Ny, a seventh receive path supporting reception of radio frequency signals of the NR Band Nx, and an eighth receive path supporting reception of radio frequency signals of the NR Band Ny.

In the implementation of the present disclosure, the radio frequency transceiver is configured to transmit and receive radio frequency signals. In an uplink, the radio frequency transceiver is configured to convert baseband signals into emission radio frequency signals. The emission radio frequency signals are processed by the transmitter circuit such as amplified and filtered by the transmitter circuit, and the processed emission radio frequency signals are converted by the antenna into electromagnetic waves of a specified frequency band to be emitted out. In a downlink, the antenna receives the electromagnetic waves of the specified frequency band, converts the electromagnetic waves into radio frequency signals, processes such as amplifies and filters the radio frequency signals, and transmits the processed radio frequency signals to the radio frequency transceiver. The radio frequency transceiver is configured to demodulate the received radio frequency signals into baseband signals to be processed by a baseband chip.

In the implementation of the present disclosure, each transmitter circuit has one transmit port and one receive port. Each receiver circuit has one receive port and one transmit port. The transmit port is configured to transmit radio frequency signals, and the receive port is configured to receive radio frequency signals. It should be noted that the ports such as transmit ports and receive ports illustrated in the figures are exemplary and do not intent to indicate an exact port position and impose any restrictions.

The multiway switch 10 has two first T ports and eight second T ports. As illustrated in FIG. 1C, the two first ports are respectively and correspondingly coupled with the transmit ports of the two transmitter circuits. The eight second T ports are respectively and correspondingly coupled with the receive ports of the eight receiver circuit. Four of the eight second T ports configured to receive radio frequency signals of the NR Band Nx are respectively coupled with the receive port of the first receiver circuit, the receive port of the third receiver circuit, the receive port of the fifth receiver circuit, and the receive port of the seventh receiver circuit. Four of the eight second T ports configured to receive radio frequency signals of the NR Band Ny are respectively coupled with the receive port of the second receiver circuit, the receive port of the fourth receiver circuit, the receive port of the sixth receiver circuit, and the receive port of the eighth receiver circuit.

Since the radio frequency transceiver needs to be adapted to the two transmitter circuits and the eight receiver circuits, the radio frequency transceiver at least has two transmit ports and eight receive ports. As illustrated in FIG. 1C, the radio frequency transceiver has two transmit ports: TX_Nx port and TX_Ny port, and eight receive ports: RX1 Nx port, RX1 Ny port, RX2_Nx port, RX2 Ny port, RX3_Nx port, RX3 Ny port, RX4_Nx port, and RX4 Ny port. The TX_Nx port is coupled with the receive port of one of the transmitter circuits, the TX_Ny port is coupled with the receive port of the other transmitter circuit, the RX1 Nx port is coupled with the transmit port of the first receiver circuit, the RX2_Nx port is coupled with the transmit port of the third receiver circuit, the RX3_Nx port is coupled with the transmit port of the fifth receiver circuit, the RX4_Nx port is coupled with the transmit port of the seventh receiver circuit, the RX1 Ny port is coupled with the transmit port of the second receiver circuit, the RX2 Ny port is coupled with the transmit port of the fourth receiver circuit, the RX3 Ny port is coupled with the transmit port of the sixth receiver circuit, and the RX4 Ny port is coupled with the transmit port of the eighth receiver circuit.

It can be seen that in the implementation, since the multiway switch has the first T ports and the second T ports, and the number of the second T ports is not zero, compared with the configuration in which all the T ports are fully coupled with the P ports, the number of the switches is reduced, that is, the number of the switches in the transmit paths and the receive paths of the radio frequency system of the electronic device is reduced, path loss is reduced, thereby improving transmit power and sensitivity, improving data transmission rate in 5G NR, increasing an uplink and downlink coverage range of a mobile phone, and reducing power consumption and cost.

In a possible implementation, the radio frequency circuit includes at least one independent circuit module. The at least one independent circuit module has first ports and second ports. The first ports include transmit ports, and the second ports include receive ports. The first ports and the first T ports are in a one-to-one coupling relationship, and the second ports and the second T ports are in a one-to-one coupling relationship.

The transmit ports of the independent circuit module correspond to the ports of the transmitter circuits. The receive ports of the independent circuit module correspond to the ports of the receiver circuits.

It can be seen that in the implementation, the radio frequency circuit adapted to the multiway switch at least includes one independent circuit module, thus it is advantageous to improve flexibility of adapting and reduce cost.

Figure 2:
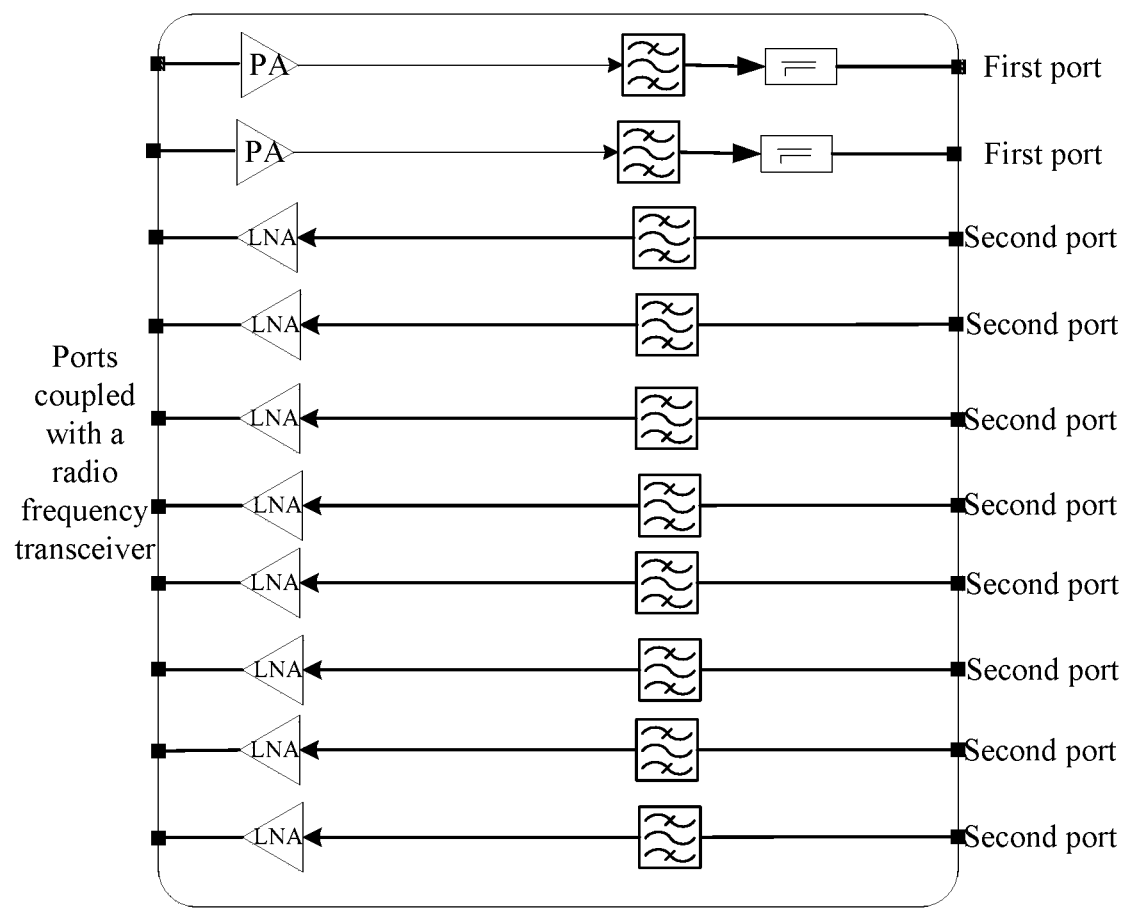
FIG. 2 is a schematic structural diagram illustrating a radio frequency circuit of an electronic device according to an implementation of the disclosure.

In a possible implementation, as illustrated in FIG. 2, under the condition that one independent circuit module is included, the independent circuit module includes two transmitter circuits, eight receiver circuits, two first ports, and eight second ports. Each transceiver circuit has a transmit port coupled with one first port of the independent circuit module. Each receiver circuit has a receive port coupled with one second port of the independent circuit module.

It can be seen that in the implementation, the radio frequency circuit merely includes one independent circuit module, has a high degree of integration, and occupies small space, thereby reducing cost.

Figure 3:
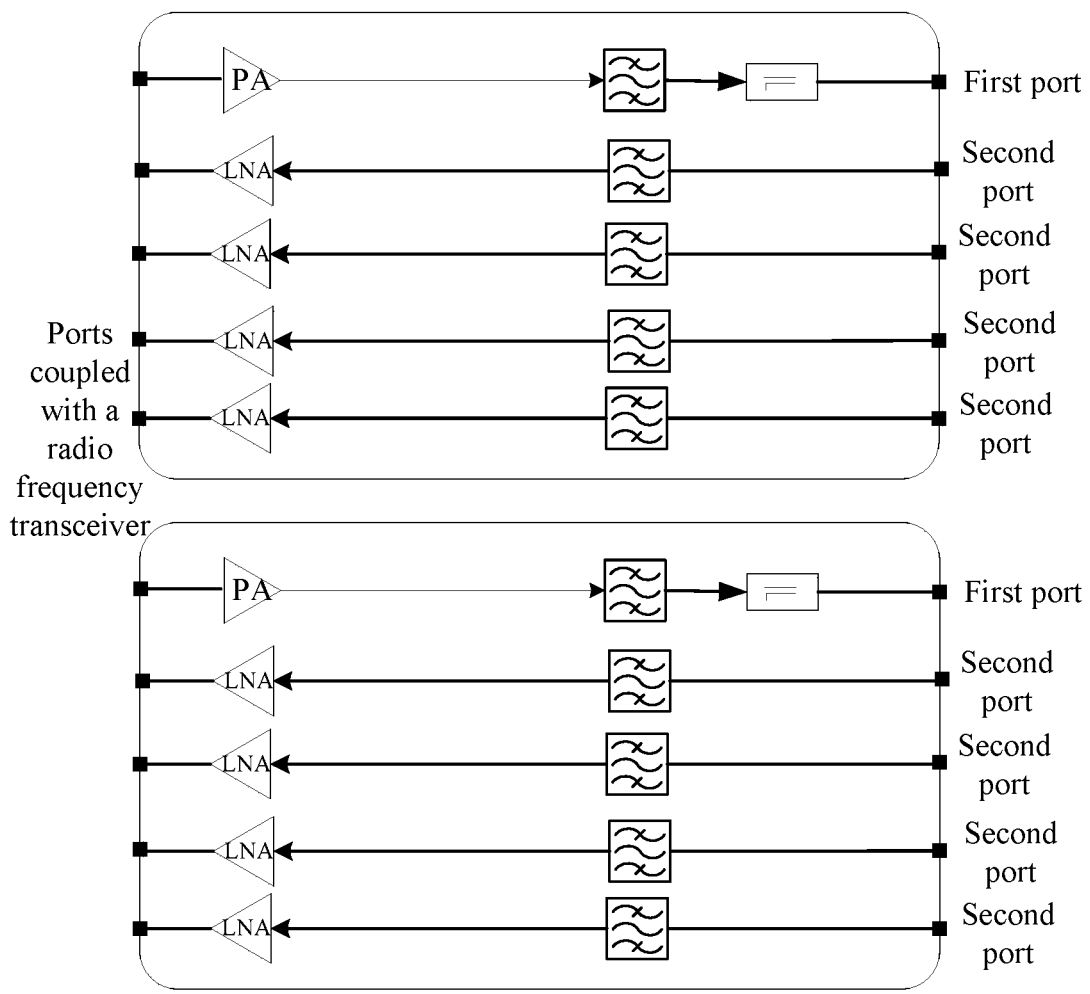
FIG. 3 is a schematic structural diagram illustrating another radio frequency circuit of an electronic device according to an implementation of the disclosure.

In a possible implementation, as illustrated in FIG. 3, under the condition that two independent circuit modules are included, the two independent circuit modules include a first independent circuit module and a second independent circuit module. Each independent circuit module includes one transmitter circuit, four receiver circuits, one first port, and four second ports. The transmitter circuit has a transmit port coupled with one first port of the independent circuit module which includes the transmitter circuit. Each receiver circuit has a receive port coupled with one second port of the independent circuit module which includes the receiver circuit.

It can be seen that in the implementation, the radio frequency circuit includes two independent circuit modules, the number of the independent circuit modules is small, the radio frequency circuit has a high degree of integration, and occupies small space, thereby reducing cost. In addition, the two independent circuit modules have the same structure, thereby reducing manufacturing cost.

In a possible implementation, for the radio frequency circuit as illustrated in FIG. 1C, under the condition that two independent circuit modules are included, the two independent circuit modules include a first independent circuit module and a second independent circuit module. The first independent circuit module includes two transmitter circuits and two first ports. Each transmitter circuit has a transmit port coupled with one first port of the independent circuit module which includes the transmitter circuit. The second independent circuit module includes eight receiver circuits and eight second ports. Each receiver circuit has a receive port coupled with one second port of the independent circuit module which includes the receiver circuit.

Figure 4:
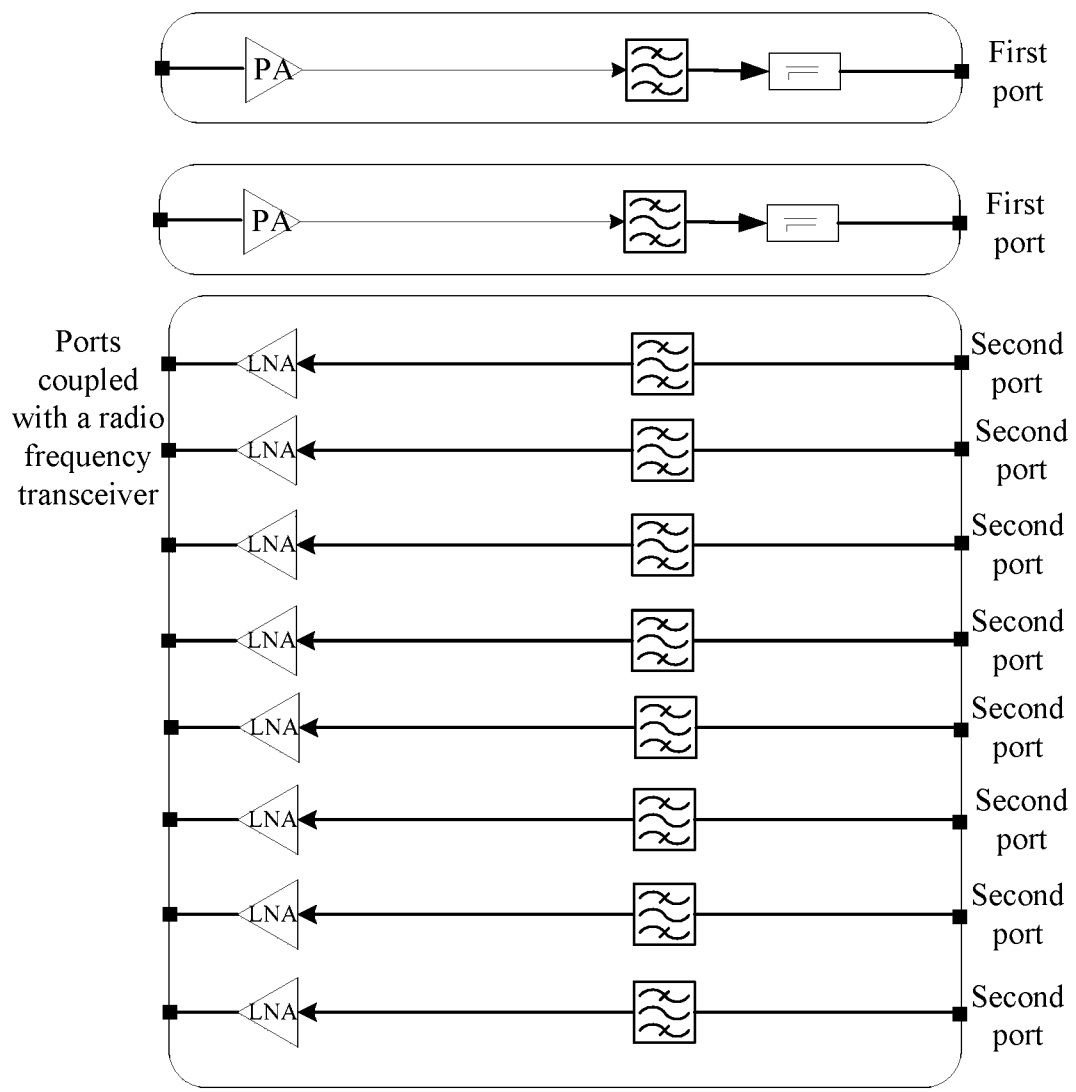
FIG. 4 is a schematic structural diagram illustrating another radio frequency circuit of an electronic device according to an implementation of the disclosure.

In a possible implementation, for the radio frequency circuit as illustrated in FIG. 4, under the condition that three independent circuit modules are included, the three independent circuit modules include a first independent circuit module, a second independent circuit module, and a third independent circuit module. The first independent circuit module and the second independent circuit module both include one transmitter circuit and one first port. Each transmitter circuit has a transmit port coupled with the first port of the independent circuit module which includes the transmitter circuit. The third independent circuit module includes eight receiver circuits and eight second ports. Each receiver circuit has a receive port coupled with one second port of the independent circuit module which includes the receiver circuit.

In a possible implementation, under the condition that three independent circuit modules are included, the three independent circuit modules include a first independent circuit module, a second independent circuit module, and a third independent circuit module. The first independent circuit module and the second independent circuit module both include one transmitter circuit, one receiver circuit, one first port, and one second port. The third independent circuit module includes six receiver circuits and six second ports. Each transmitter circuit has a transmit port coupled with the first port of the independent circuit module which includes the transmitter circuit. Each receiver circuit has a receive port coupled with one second port of the independent circuit module which includes the receiver circuit.

In a possible implementation, under the condition that three independent circuit modules are included, the three independent circuit modules include a first independent circuit module, a second independent circuit module, and a third independent circuit module. The first independent circuit module and the second independent circuit module both include one transmitter circuit, two receiver circuits, one first port, and two second ports. The third independent circuit module includes four receiver circuits and four second ports. Each transmitter circuit has a transmit port coupled with the first port of the independent circuit module which includes the transmitter circuit. Each receiver circuit has a receive port coupled with one second port of the independent circuit module which includes the receiver circuit.

In a possible implementation, under the condition that three independent circuit modules are included, the three independent circuit modules include a first independent circuit module, a second independent circuit module, and a third independent circuit module. The first independent circuit module and the second independent circuit module both include one transmitter circuit, three receiver circuits, one first port, and three second ports. The third independent circuit module includes two receiver circuits and two second ports. Each transmitter circuit has a transmit port coupled with the first port of the independent circuit module which includes the transmitter circuit. Each receiver circuit has a receive port coupled with one second port of the independent circuit module which includes the receiver circuit.

It can be seen that in the implementation, the radio frequency circuit includes three independent circuit modules, the number of the independent circuit modules is small, the radio frequency circuit has a high degree of integration, and occupies a small space, thus cost is reduced. In addition, two independent circuit modules have the same structure, multiplexing of modules is improved, and manufacturing cost is reduced.

Figure 5:
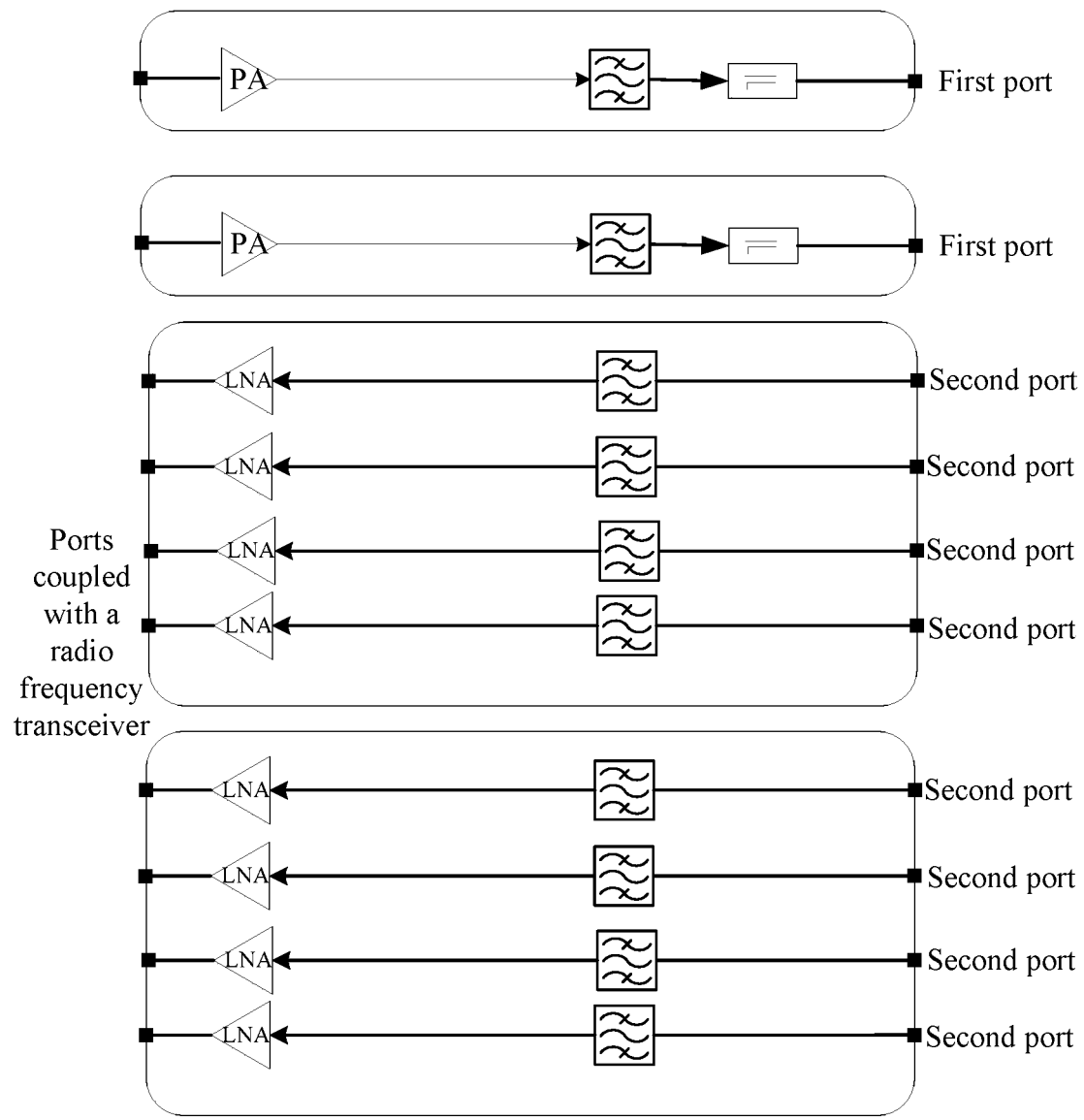
FIG. 5 is a schematic structural diagram illustrating another radio frequency circuit of an electronic device according to an implementation of the disclosure.

In a possible implementation, as illustrated in FIG. 5, under the condition that four independent circuit modules are included, the four independent circuit modules include a first independent circuit module, a second independent circuit module, a third independent circuit module, and a fourth independent circuit module. The first independent circuit module and the second independent circuit module both include one transmitter circuit and one first port. Each transmitter circuit has a transmit port coupled with the first port of the independent circuit module which includes the transmitter circuit. The third independent circuit module and the fourth independent circuit module both include four receiver circuits and four second ports. Each receiver circuit has a receive port coupled with one second port of the independent circuit module which includes the receiver circuit.

In a possible implementation, under the condition that four independent circuit modules are included, the four independent circuit modules include a first independent circuit module, a second independent circuit module, a third independent circuit module, and a fourth independent circuit module. The first independent circuit module and the second independent circuit module both include one transmitter circuit, one receiver circuit, one first port, and one second port. The third independent circuit module and the fourth independent circuit module both include three receiver circuits and three second ports. Each transmitter circuit has a transmit port coupled with the first port of the independent circuit module which includes the transmitter circuit. Each receiver circuit has a receive port coupled with the second port of the independent circuit module which includes the receiver circuit.

In a possible implementation, under the condition that four independent circuit modules are included, the four independent circuit modules include a first independent circuit module, a second independent circuit module, a third independent circuit module, and a fourth independent circuit module. The first independent circuit module and the second independent circuit module both include one transmitter circuit, two receiver circuits, one first port, and two second ports. The third independent circuit module and the fourth independent circuit module both include two receiver circuits and two second ports. Each transmitter circuit has a transmit port coupled with the first port of the independent circuit module which includes the transmitter circuit. Each receiver circuit has a receive port coupled with the second port of the independent circuit module which includes the receiver circuit.

It can be seen that in the implementation, the radio frequency circuit includes four independent circuit modules, two of the four independent circuit modules are the same, and another two of the four independent circuit modules are the same, thus multiplexing of modules is improved, and manufacturing cost is reduced.

Figure 6:
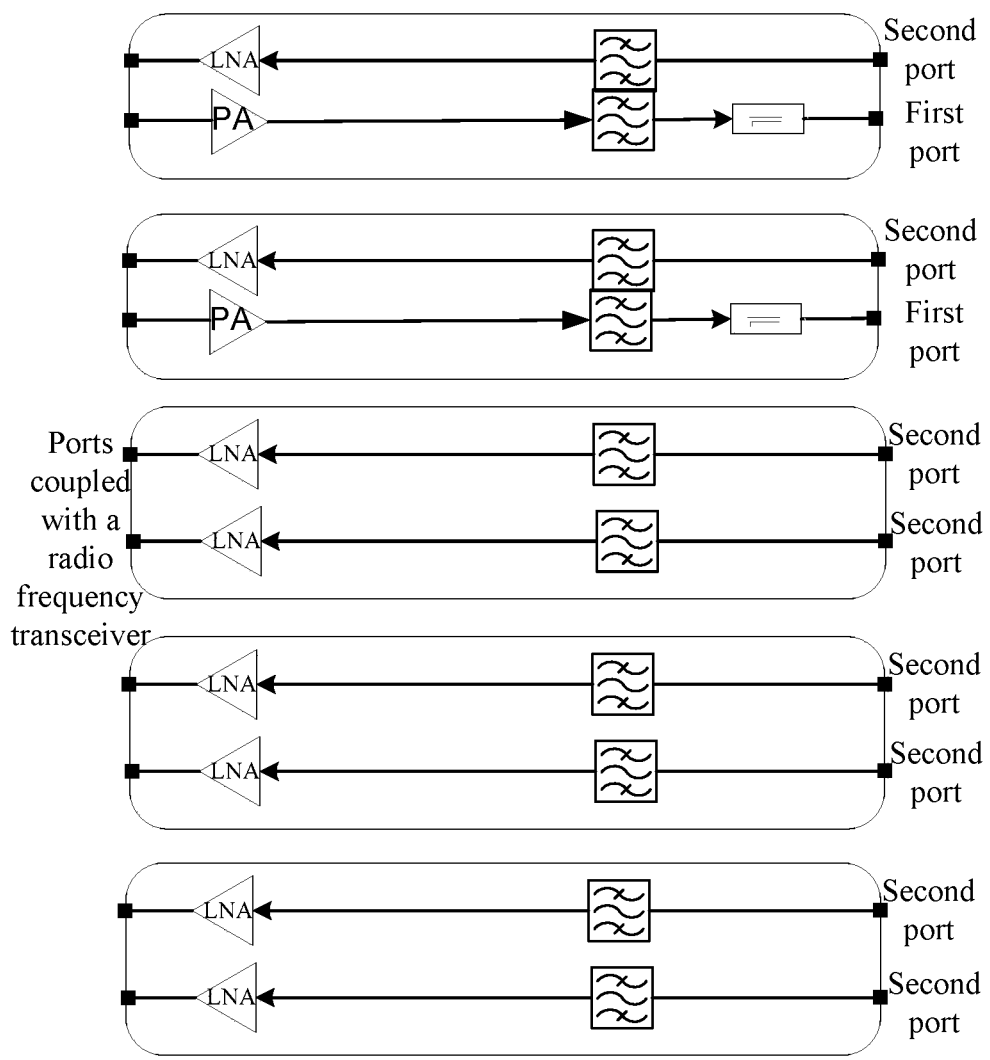
FIG. 6 is a schematic structural diagram illustrating another radio frequency circuit of an electronic device according to an implementation of the disclosure.

In a possible implementation, as illustrated in FIG. 6, under the condition that five independent circuit modules are included, the five independent circuit modules include a first independent circuit module, a second independent circuit module, a third independent circuit module, a fourth independent circuit module, and a fifth independent circuit module. The first independent circuit module and the second independent circuit module both include one transmitter circuit, one receiver circuit, one first port, and one second port. The third independent circuit module, the fourth independent circuit module, and the fifth independent circuit module all include two receiver circuits and two second ports. Each transmitter circuit has a transmit port coupled with the first port of the independent circuit module which includes the transmitter circuit. Each receiver circuit has a receive port coupled with one second port of the independent circuit module which includes the receiver circuit.

It can be seen that in the implementation, the radio frequency circuit include five independent circuit modules, two of the five independent circuit modules are the same, and the remaining independent circuit modules are the same, thus multiplexing of modules is improved, and manufacturing cost is reduced.

Figure 7:
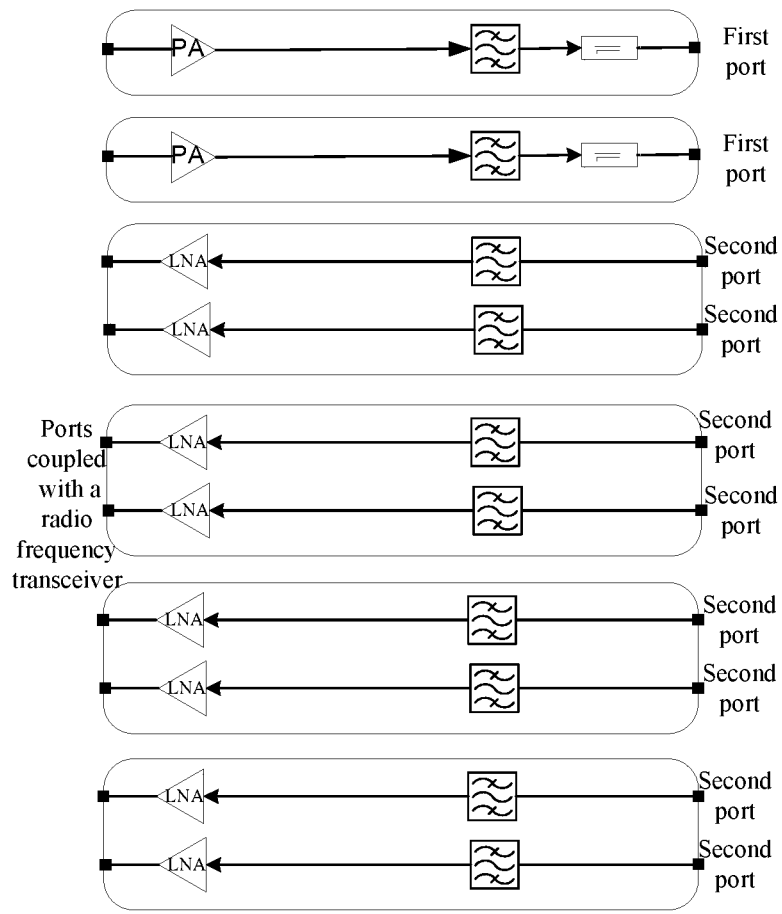
FIG. 7 is a schematic structural diagram illustrating another radio frequency circuit of an electronic device according to an implementation of the disclosure.

In a possible implementation, as illustrated in FIG. 7, under the condition that six independent circuit modules are included, the six independent circuit modules include a first independent circuit module, a second independent circuit module, a third independent circuit module, a fourth independent circuit module, a fifth independent circuit module, and a sixth independent circuit module. The first independent circuit module and the second independent circuit module both include one transmitter circuit and one first port. Each transmitter circuit has a transmit port coupled with the first port of the independent circuit module which includes the transmitter circuit. The third independent circuit module, the fourth independent circuit module, the fifth independent circuit module, and the sixth independent circuit module all include two receiver circuits and two second ports. Each receiver circuit has a receive port coupled with one second port of the independent circuit module which includes the receiver circuit.

It can be seen that in the implementation, the radio frequency circuit include six independent circuit modules, two of the five independent circuit modules are the same, and the remaining independent circuit modules are the same, thus multiplexing of modules is improved, and manufacturing cost is reduced.

In a possible implementation, under the condition that seven independent circuit modules are included, the seven independent circuit modules include a first independent circuit module, a second independent circuit module, a third independent circuit module, a fourth independent circuit module, a fifth independent circuit module, a sixth independent circuit module, and a seventh independent circuit module. The first independent circuit module and the second independent circuit module both include one transmitter circuit and one first port. The third independent circuit module, the fourth independent circuit module, the fifth independent circuit module all include two receiver circuits and two second ports. The sixth independent circuit module and the seventh independent circuit module both include one receiver circuit and one second port. Each transmitter circuit has a transmit port coupled with the first port of the independent circuit module which includes the transmitter circuit. Each receiver circuit has a receive port coupled with one second port of the independent circuit module which includes the receiver circuit.

In a possible implementation, under the condition that eight independent circuit modules are included, the eight independent circuit modules include a first independent circuit module, a second independent circuit module, a third independent circuit module, a fourth independent circuit module, a fifth independent circuit module, a sixth independent circuit module, a seventh independent circuit module, and an eighth independent circuit module. The first independent circuit module and the second independent circuit module both include one transmitter circuit, one receiver circuit, one first port, and one second port. The third independent circuit module, the fourth independent circuit module, the fifth independent circuit module, the sixth independent circuit module, the seventh independent circuit module, and the eighth independent circuit module all include one receiver circuit and one second port. Each transmitter circuit has a transmit port coupled with the first port of the independent circuit module which includes the transmitter circuit. Each receiver circuit has a receive port coupled with the second port of the independent circuit module which includes the receiver circuit.

In a possible implementation, under the condition that nine independent circuit modules are included, the nine independent circuit modules include a first independent circuit module, a second independent circuit module, a third independent circuit module, a fourth independent circuit module, a fifth independent circuit module, a sixth independent circuit module, a seventh independent circuit module, an eighth independent circuit module, and a ninth independent circuit module. The first independent circuit module and the second independent circuit module both include one transmitter circuit and one first port. The third independent circuit module includes two receiver circuits and two second ports The fourth independent circuit module, the fifth independent circuit module, the sixth independent circuit module, the seventh independent circuit module, the eighth independent circuit module, and the ninth independent circuit module all include one receiver circuit and one second port. Each transmitter circuit has a transmit port coupled with the first port of the independent circuit module which includes the transmitter circuit. Each receiver circuit has a receive port coupled with one second port of the independent circuit module which includes the receiver circuit What needs to be illustrated is that implementations of the radio frequency circuit may be various, and the present disclosure is not limited thereto. In addition, the first ports coupled with transmit ports of different transmitter circuits are different from each other, and the second ports coupled with receive ports of different receiver circuits are different from each other.

Figure 8A:
FIG. 8A is a schematic structural diagram illustrating a receiver circuit according to an implementation of the disclosure.
Figure 8A:
Figure 8A:
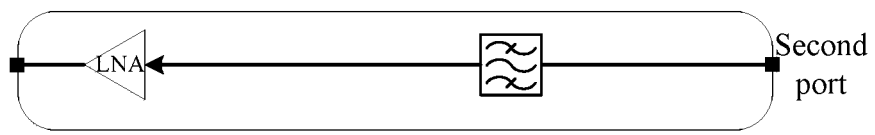

In a possible implementation, as illustrated in FIG. 8A, the receiver circuit includes one low noise amplifier (LNA) and one filter. The filter has an input port coupled with the second port of the independent circuit module, and an output port coupled with an input port of the LNA, and an output port of the LNA is coupled with a corresponding port of the radio frequency transceiver.

Figure 8B:
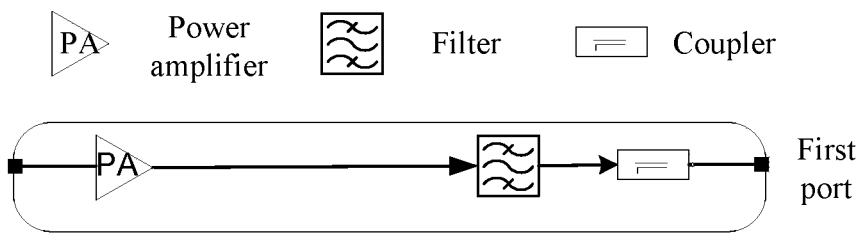
FIG. 8B is a schematic structural diagram illustrating a transmitter circuit according to an implementation of the disclosure.

In a possible implementation, as illustrated in FIG. 8B, the transmitter circuit includes one power amplifier (PA), one filter, and one coupler. The PA has an input port coupled with a corresponding port of the radio frequency transceiver, and an output port coupled with an input port of the filter. An output port of the filter is coupled with an input port of the coupler. An output port of the coupler is coupled with the first port of the independent circuit module.

What needs to be illustrated is that implementations of the receiver circuit and the transmitter circuit may be various, and the present disclosure is not limited thereto.

In a possible implementation, the four antennas include a first antenna, a second antenna, a third antenna, and a fourth antenna. The first antenna, the second antenna, the third antenna, and the fourth antenna are operable at the 5G NR frequency band.

The 5G NR frequency band may include, for example, 3.3 GHz-3.8 GHz and 4.4 GHz-5 GHz.

In a possible implementation, the four antennas include a first antenna, a second antenna, a third antenna, and a fourth antenna. The first antenna and the fourth antenna are operable at an LTE frequency band and the 5G NR frequency band. The second antenna and the third antenna are merely operable at the 5G NR frequency band.

The first antenna and the fourth antenna are intended to support DL 4×4 MIMO for some frequency bands of an LTE terminal, and two of receive antennas of the LTE terminal are shared with antennas operable at the 5G NR. The LTE frequency band may include, for example, 1880 Hz-1920 MHz and 2496 Hz-2690 MHz.

Figure 9:
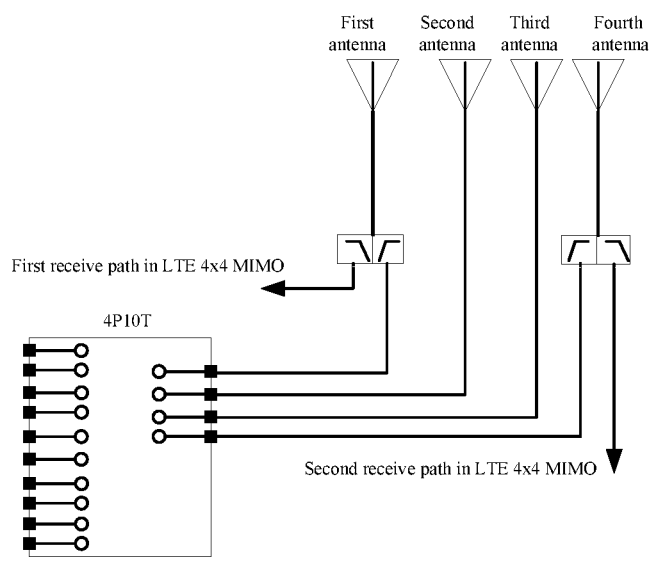
FIG. 9 is a schematic structural diagram illustrating an antenna system of an electronic device according to an implementation of the disclosure.

In a possible implementation, as illustrated in FIG. 9, the antenna system further includes a first combiner and a second combiner. The first combiner has a first port coupled with the first antenna, a second port coupled with a first receive path in LTE 4×4 MIMO of the electronic device, and a third port coupled with a corresponding P port of the multiway switch. The second combiner has a first port coupled with the fourth antenna, a second port coupled with a second receive path in the LTE 4×4 MIMO of the electronic device, and a third port coupled with a corresponding P port of the multiway switch.

The LTE 4*4 MIMO is a downlink LTE receive circuit and can be defined as a third receive path. Since the LTE currently has two receive paths, in order to support the LTE 4×4 MIMO, a third receive path and a fourth receive path are added.

According to performance of the four antennas, the electronic device arranges one antenna with better performance for primary receive (PRx) for a standby mode. Moreover, first T ports in the switch having both the transmit function and the receive function can be configured for Tx and PRx functions, and thus the antennas can be switched arbitrarily. In this way, there is no need to restrict the coupling ports of shared antennas.

Figure 10:
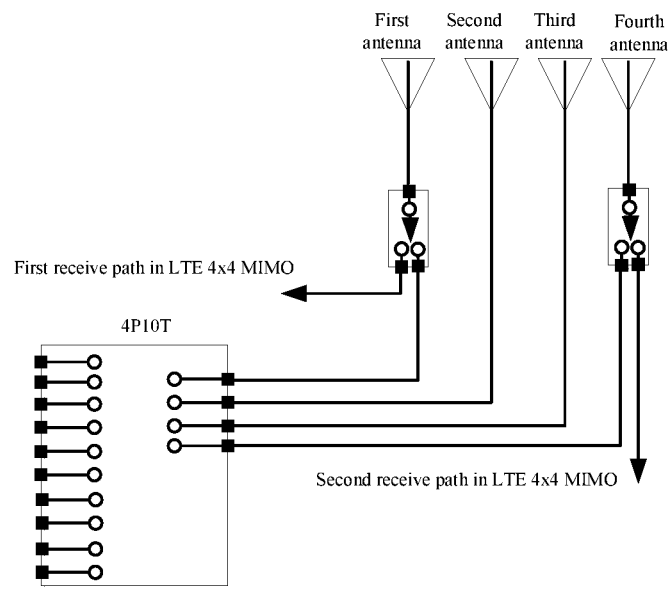
FIG. 10 is a schematic structural diagram illustrating another antenna system of an electronic device according to an implementation of the disclosure.

In a possible implementation, as illustrated in FIG. 10, the antenna system further includes a first single-pole double-throw (SPDT) switch and a second SPDT switch. The first SPDT switch has a first port coupled with the first antenna, a second port coupled with the first receive path in the LTE 4×4 MIMO of the electronic device, and a third port coupled with a corresponding P port of the multiway switch. The second SPDT switch has a first port coupled with the fourth antenna, a second port coupled with the second receive path in the LTE 4×4 MIMO of the electronic device, and a third port coupled with a corresponding P port of the multiway switch.

Figure 11:
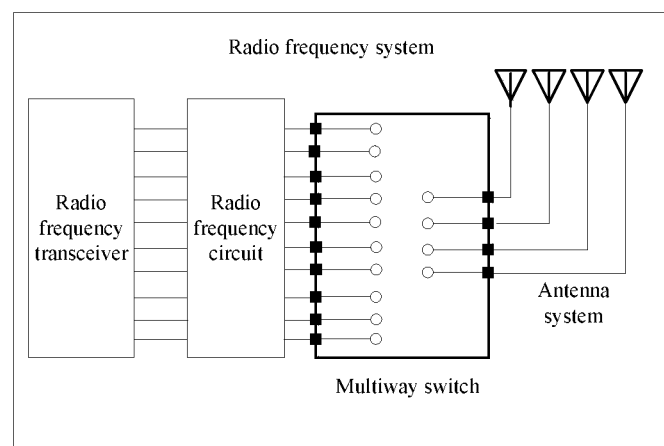
FIG. 11 is a schematic structural diagram illustrating a radio frequency system according to an implementation of the disclosure.

Referring to FIG. 11, FIG. 11 is a schematic structural diagram illustrating a radio frequency system according to an implementation of the disclosure. The radio frequency system includes an antenna system, a radio frequency circuit, and the multiway switch according to any of the implementations above. The multiway switch is coupled with the radio frequency circuit and the antenna system. The multiway switch has ten T ports and four P ports. The ten T ports include two first T ports, and each of the two first T ports is coupled with all the four P ports. The antenna system include four antennas corresponding to four P ports. The multiway switch is configured to implement a preset function of the radio frequency system, where the preset function is a function of transmitting an SRS through transmit antennas corresponding to four P ports in turn.

It can be seen that for a transmit path and a receive path of the radio frequency system of the electronic device, the transmit path may include one independent 4P10T switch, or include one independent SPDT switch and one independent 4P10T switch. The receive path may include one independent 4P10T switch, or may include one independent SPDT switch and one independent 4P10T switch. By means of integrating more switch functions of the transmit path and the receive path of the radio frequency system into the 4P10T switch, the number of the independent switches of the transmit path and the receive path can be effectively reduced.

Figure 12:
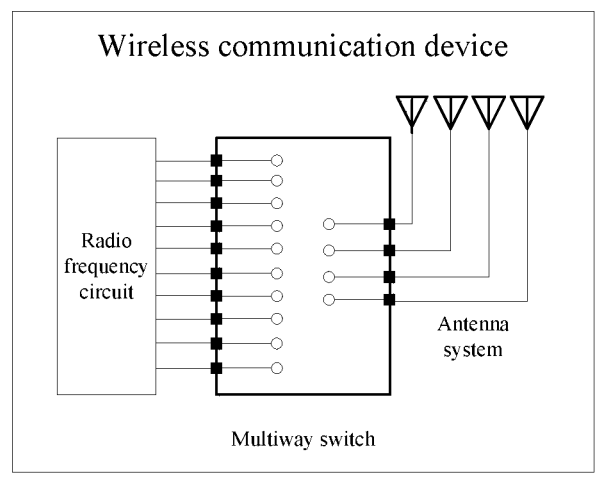
FIG. 12 is a schematic structural diagram illustrating a communication device according to an implementation of the disclosure.

Referring to FIG. 12, FIG. 12 is a schematic structural diagram illustrating a communication device according to an implementation of the disclosure. The communication device includes an antenna system, a radio frequency circuit, and the multiway switch described in any of the implementations above. The multiway switch is coupled with the radio frequency circuit and the antenna system. The multiway switch has ten T ports and four P ports. The ten T ports include two first T ports, and each of the two first T ports is coupled with all the four P ports. The antenna system include four antennas corresponding to four P ports. The multiway switch is configured to implement a preset function of the communication device, where the preset function is a function of transmitting an SRS through the four antennas in turn. The communication device includes at least one of: an electronic device and a network device.

Figure 13:
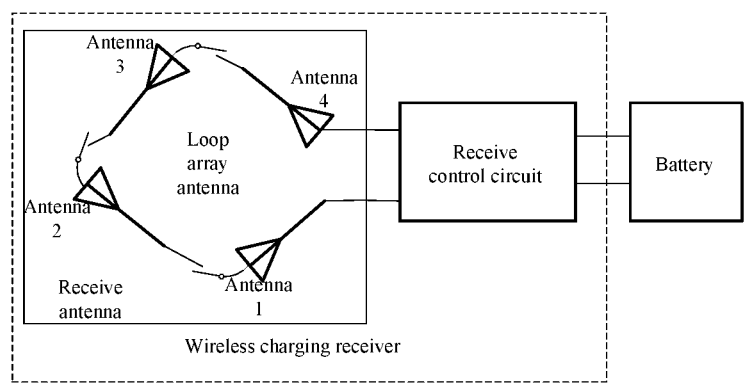
FIG. 13 is a schematic diagram illustrating a wireless charging receiver capable of multiplexing antennas of a communication device according to an implementation of the disclosure.

In addition, as illustrated in FIG. 13, the four antennas in the antenna system illustrated in the implementations of the disclosure can also be multiplexed by a wireless charging receiver of the electronic device. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an "exclusive encryption" wireless charging mode.

The receive antenna may be an antenna constituted by at least one of the four antennas (in the case of multiple antennas, the multiple antennas are strobed via switches).

Figure 14:
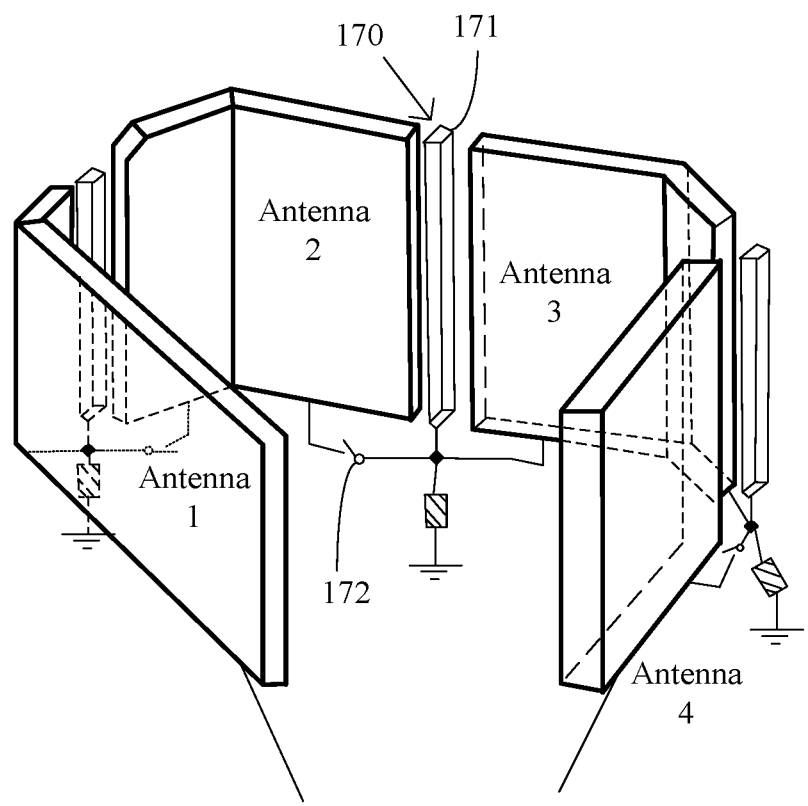
FIG. 14 is a schematic structural diagram illustrating a loop array antenna including four antennas according to an implementation of the disclosure.

For example, as illustrated in FIG. 14, the receive antenna is a loop array antenna including the four antennas described above. The four antennas include an antenna 1, an antenna 2, an antenna 3, and an antenna 4. The antenna 1 and the antenna 4 are operable at both the LTE frequency band and the 5G NR frequency band, while the antenna 2 and the antenna 3 are just operable at the 5G NR frequency band. A port of the antenna 1 and a port of the antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The electronic device can switch on the switch 172 of each gate circuit 170 in a wireless charging mode to form a loop array antenna to receive energy. By adding the spacers 171 among the antennas, the gate circuit 170 can reduce mutual coupling among the multiple antennas of the electronic device in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since the antenna 1 and the antenna 4 have capabilities stronger than that of the antenna 2 and the antenna 3, the loop array antenna thus arranged can reduce energy loss in transmission as much as possible.

The above is the implementations of the implementations of the present disclosure. It shall be pointed out that a person ordinarily skilled in the art can make some improvements and polishes without departing from the principle of the implementations of the present disclosure. These improvements and polishes shall be construed to be the protection range of the present disclosure.

What is claimed is:

1. A multi way switch, comprising:
   ten T ports and four P ports, the ten T ports comprising two first T ports, each of the two first T ports being coupled with all the four P ports; and
   the ten T ports being configured to be coupled with a radio frequency circuit of a communication device, the four P ports being configured to be coupled with an antenna system comprising four antennas of the communication device; and
   the multi way switch being configured to implement a function of transmitting a sounding reference signal (SRS) through the four antennas in turn.

2. The multiway switch of claim 1, wherein the ten T ports further comprise eight second T ports, each of the eight second T ports is merely coupled with one of the four P ports, the second T ports configured to receive radio frequency signals of the same frequency band are coupled with different P ports, the four P ports and the four antennas are in a one-to-one coupling relationship, the first T ports are configured to at least support a transmit function, and the second T ports are configured to merely support a receive function.

3. The multiway switch of claim 1, wherein the multiway switch is consisted of field effect transistors, and the number of the field effect transistors of the multi way switch is 62.

4. A radio frequency system, comprising an antenna system, a radio frequency circuit, and a multiway switch coupled with the radio frequency circuit and the antenna system;
   the multiway switch having ten T ports and four P ports, the ten T ports comprising two first T ports, each of the two first T ports being coupled with all the four P ports;
   the antenna system comprising four antennas corresponding to the four P ports; and
   the multiway switch being configured to implement a function of transmitting a sounding reference signal (SRS) through the four antennas in turn.

5. The radio frequency system of claim 4, wherein the ten T ports further comprise eight second T ports, each of the eight second T ports is merely coupled with one of the four P ports, the second T ports configured to receive radio frequency signals of the same frequency band are coupled with different P ports, the four P ports and the four antennas are in a one-to-one coupling relationship, the first T ports are configured to at least support a transmit function, and the second T ports are configured to merely support a receive function.

6. The radio frequency system of claim 5, wherein the radio frequency circuit comprises at least one independent circuit module;
   the at least one independent circuit module has first ports and second ports, the first ports comprise transmit ports, and the second ports comprise receive ports; and
   the first ports and the first T ports are in a one-to-one coupling relationship, and the second ports and the second T ports are in a one-to-one coupling relationship.

7. A communication device, comprising an antenna system, a radio frequency circuit, and a multiway switch coupled with the radio frequency circuit and the antenna system;
the multiway switch having ten T ports and four P ports, the ten T ports comprising two first T ports, each of the two first T ports being coupled with all the four P ports;
the antenna system comprising four antennas corresponding to the four P ports; and
the multi way switch being configured to implement a function of transmitting a sounding reference signal (SRS) through the four antennas in turn.

8. The communication device of claim 7, wherein the ten T ports further comprise eight second T ports, each of the eight second T ports is merely coupled with one of the four P ports, the second T ports configured to receive radio frequency signals of the same frequency band are coupled with different P ports, the four P ports and the four antennas are in a one-to-one coupling relationship, the first T ports are configured to at least support a transmit function, and the second T ports are configured to merely support a receive function.

9. The communication device of claim 8, wherein the radio frequency circuit comprises at least one independent circuit module;
the at least one independent circuit module has first ports and second ports, the first ports comprise transmit ports, and the second ports comprise receive ports; and
the first ports and the first T ports are in a one-to-one coupling relationship, and the second ports and the second T ports are in a one-to-one coupling relationship.

10. The communication device of claim 9, wherein the radio frequency circuit comprises one independent circuit module, the independent circuit module comprises two transmitter circuits, eight receiver circuits, two first ports, and eight second ports; and
each of the two transmitter circuits has a transmit port coupled with one first port of the independent circuit module, and each of the eight receiver circuits has a receive port coupled with one second port of the independent circuit module.

11. The communication device of claim 9, wherein the radio frequency circuit comprises two independent circuit modules, the two independent circuit modules comprise a first independent circuit module and a second independent circuit module;
each of the two independent circuit modules comprises one transmitter circuit, four receiver circuits, one first port, and four second ports; and
each transmitter circuit has a transmit port coupled with the first port of the independent circuit module which comprises the transmitter circuit, and each receiver circuit has a receive port coupled with one second port of the independent circuit module which comprises the receiver circuit.

12. The communication device of claim 9, wherein the radio frequency circuit comprises three independent circuit modules, the three independent circuit modules comprise a first independent circuit module, a second independent circuit module, and a third independent circuit module;
the first independent circuit module and the second independent circuit module both comprise one transmitter circuit and one first port, and each transmitter circuit has a transmit port coupled with the first port of the independent circuit module which comprises the transmitter circuit; and
the third independent circuit module comprises eight receiver circuits and eight second ports, each receiver circuit has a receive port coupled with one second port of the independent circuit module which comprises the receiver circuit.

13. The communication device of claim 9, wherein the radio frequency circuit comprises four independent circuit modules, the four independent circuit modules comprise a first independent circuit module, a second independent circuit module, a third independent circuit module, and a fourth independent circuit module;
the first independent circuit module and the second independent circuit module both comprise one transmitter circuit and one first port, and each transmitter circuit has a transmit port coupled with the first port of the independent circuit module which comprises the transmitter circuit; and
the third independent circuit module and the fourth independent circuit module both comprise four receiver circuits and four second ports, each receiver circuit has a receive port coupled with one second port of the independent circuit module which comprises the receiver circuit.

14. The communication device of claim 9, wherein the radio frequency circuit comprises five independent circuit modules, the five independent circuit modules comprise a first independent circuit module, a second independent circuit module, a third independent circuit module, a fourth independent circuit module, and a fifth independent circuit module;
the first independent circuit module and the second independent circuit module both comprise one transmitter circuit, one receiver circuit, one first port, and one second port;
the third independent circuit module, the fourth independent circuit module, and the fifth independent circuit module all comprise two receiver circuits and two second ports;
each transmitter circuit has a transmit port coupled with the first port of the independent circuit module which comprises the transmitter circuit; and
each receiver circuit has a receive port coupled with one second port of the independent circuit module which comprises the receiver circuit.

15. The communication device of claim 9, wherein the radio frequency circuit comprises six independent circuit modules, the six independent circuit modules comprises a first independent circuit module, a second independent circuit module, a third independent circuit module, a fourth independent circuit module, a fifth independent circuit module, and a sixth independent circuit module;
the first independent circuit module and the second independent circuit module both comprise one transmitter circuit and one first port; each transmitter circuit has a transmit port coupled with the first port of the independent circuit module which comprises the transmitter circuit; and
the third independent circuit module, the fourth independent circuit module, the fifth independent circuit module, and the sixth independent circuit module all comprise two receiver circuits and two second ports; each receiver circuit has a receive port coupled with one second port of the independent circuit module which comprises the receiver circuit.

16. The communication device of claim 10, wherein
the receiver circuit comprises one low noise amplifier (LNA) and one filter, the filter has an input port coupled with the second port of the independent circuit module, and an output port coupled with an input port of the LNA, and an output port of the LNA is coupled with a corresponding port of a radio frequency transceiver of the communication device; and the transmitter circuit comprises one power amplifier (PA), one filter, and one coupler, the PA has an input port coupled with a corresponding port of the radio frequency transceiver, and an output port coupled with the filter, the filter has an output port coupled with an input port of the coupler, and an output port of the coupler is coupled with the first port of the independent circuit module.

17. The communication device of claim 7, wherein the four antennas comprise a first antenna, a second antenna, a third antenna, and a fourth antenna; and the first antenna, the second antenna, the third antenna, and the fourth antenna are all operable at a fifth generation new radio (5G NR) frequency band.

18. The communication device of claim 7, wherein the four antennas comprise a first antenna, a second antenna, a third antenna, and a fourth antenna;

the first antenna and the fourth antenna are operable at a long term evolution (LTE) frequency band and a 5G NR frequency band; and the second antenna and the third antenna are merely operable at the 5G NR frequency band.

19. The communication device of claim 18, wherein the antenna system further comprises a first combiner and a second combiner;

the first combiner has a first port coupled with the first antenna, a second port coupled with a first receive path in LTE 4×4 multiple-input multiple-output (MIMO) of the communication device, and a third port coupled with a corresponding P port of the multi way switch; and the second combiner has a first port coupled with the fourth antenna, a second port coupled with a second receive path in the LTE 4×4 MIMO of the communication device, and a third port coupled with a corresponding P port of the multi way switch.

20. The communication device of claim 18, wherein the antenna system further comprises a first single-pole double-throw (SPDT) switch and a second SPDT switch;

the first SPDT switch has a first port coupled with the first antenna, a second port coupled with a first receive path in LTE 4×4 MIMO of the communication device, and a third port coupled with a corresponding P port of the multi way switch; and the second SPDT switch has a first port coupled with the fourth antenna, a second port coupled with a second receive path in the LTE 4×4 MIMO of the communication device, and a third port coupled with a corresponding P port of the multi way switch.

* * * * *